(12) United States Patent
Westerfield et al.

(10) Patent No.: US 8,566,630 B2
(45) Date of Patent: Oct. 22, 2013

(54) APPARATUS, METHODS AND COMPUTER PROGRAM PRODUCTS SUPPORTING AUTOMATIC NETWORK IDENTIFICATION FOR POWER SUPPLIES

(75) Inventors: Michael Andrew Westerfield, Durham, NC (US); Christian Gale Redmond, Raleigh, NC (US); Jonathan Aaron Rodriguez, Raleigh, NC (US); Jason Scott Anderson, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 1792 days.

(21) Appl. No.: 11/565,102

(22) Filed: Nov. 30, 2006

(65) Prior Publication Data

US 2008/0133955 A1    Jun. 5, 2008

(51) Int. Cl.
*G06F 3/00* (2006.01)
(52) U.S. Cl.
USPC ............................................. 713/340; 710/9
(58) Field of Classification Search
USPC ........................................................ 713/340
See application file for complete search history.

(56) References Cited

U.S. PATENT DOCUMENTS

| | | | |
|---|---|---|---|
| 5,323,385 A | | 6/1994 | Jurewicz et al. |
| 5,535,336 A | * | 7/1996 | Smith et al. ................... 709/225 |
| 6,366,964 B1 | * | 4/2002 | Shima et al. ...................... 710/8 |
| 6,629,247 B1 | | 9/2003 | Hall et al. |
| 6,760,308 B1 | * | 7/2004 | Ghanma et al. ............... 370/235 |
| 7,254,662 B2 | * | 8/2007 | Heighway et al. ............ 710/305 |
| 2004/0064591 A1 | * | 4/2004 | Noble ............................ 709/250 |

OTHER PUBLICATIONS

"Distributed on-demand address assignment in wireless sensor networks". Schurgers et al. 2002. IEEE Transactions on Parallel and Distributed Systems. vol. 13, Issue 10. pp. 1056-1065.*

* cited by examiner

*Primary Examiner* — Kim Huynh
*Assistant Examiner* — Eric Chang
(74) *Attorney, Agent, or Firm* — Myers Bigel Sibley & Sajovec (57) ABSTRACT

An uninterruptible power supply (UPS) apparatus can include an uninterruptible power supply circuit configured to provide electrical power to a load corresponding to a loss of line power, a network communications interface circuit associated with the uninterruptible power supply circuit, configured to be coupled to a network and a self-identification circuit that determines network identifier availability responsive to communications on the network and assigns a determined available network identifier responsive to an identification enable signal. Methods of self-identification of a device in a network, include determining an identifier via a self-identification process responsive to a relative position in the network.

17 Claims, 5 Drawing Sheets

APPARATUS, METHODS AND COMPUTER PROGRAM PRODUCTS SUPPORTING AUTOMATIC NETWORK IDENTIFICATION FOR POWER SUPPLIES

BACKGROUND OF THE INVENTION

The present invention relates to electronic devices, and more particularly, to assigning identifiers to networked power supply apparatus.

Uninterruptible Power Supply (UPS) systems are power conversion systems that are commonly used to provide conditioned, reliable power for devices and systems such as computer networks, telecommunications networks, medical equipment and the like. UPS systems can provide temporary power to the devices and systems so that the devices and systems can continue to operate despite a loss of the primary power source and thereby can reduce the likelihood that valuable data may be lost.

UPS systems may provide uninterrupted power by switching from a primary power source to a secondary power source if loss of the primary power source is detected. When the primary power source is restored, the UPS system may switch from the secondary power source back to the primary power source. Similarly, the UPS system may switch from the primary power source to the secondary power source if the UPS system determines that the primary power source is inappropriate. For example, if a voltage level of the primary power source is less than a minimum acceptable level, the UPS system may provide uninterrupted power by switching from the primary power source to the secondary power source.

Conventional UPS systems can include separate modules that provide respective functions to provide the overall operation of the UPS system. For example, some conventional UPS systems include separate modules such as rectifiers, inverters, batteries, and switches that cooperate to provide the overall function of the UPS systems. Moreover, the separate modules may need to communicate to provide the overall UPS system functions. For example, in some of the scenarios described above, a rectifier module may need to communicate the condition of the power provided by the primary power source so that the UPS system can determine whether to switch to the secondary power source.

Some conventional systems may use a network, such as a Controller Area Network (CAN), to communicate between modules in the system. One such system is discussed, for example, in U.S. Pat. No. 5,323,385 to Jurewicz et al., entitled Serial Bus Communication Method in a Refrigeration System. Some of these systems use identifiers to uniquely identify modules within the system. One conventional approach of providing unique identifiers to modules uses a customized connector for each module in the system that provides a unique set of signals to each. One type of customized connector is disclosed, for example, in U.S. Pat. No. 6,629,247, entitled Methods, Systems, and Computer Program Products for Communications in Uninterruptible Power Supply Systems Using Controller Area Networks.

Other systems may provide for randomly assigned identifiers to uniquely identify the modules within the system. This can be problematic, however, in the context of maintenance and/or repair services that may rely on the identifier to determine which of the modules requires repair and/or service. Still other systems may use a separate controllers and/or a master module to provide identifiers with the modules.

SUMMARY OF THE INVENTION

In some embodiments of the invention, an uninterruptible power supply (UPS) apparatus includes an uninterruptible power supply circuit configured to provide electrical power to a load corresponding to a loss of line power. The apparatus further includes a network communications interface circuit associated with the uninterruptible power supply circuit, configured to be coupled to a network and a self-identification circuit that determines network identifier availability responsive to communications on the network and assigns a determined available network identifier responsive to an identification enable signal. In some embodiments, the self-identification circuit is configured to monitor network identifier availability on a network communications bus via the network communications interface circuit and to receive the identification enable signal on a signal line independent of the network communications bus. In further embodiments, the self-identification circuit is configured to generate an identification status output signal responsive to assignment of the available network identifier. In some embodiments, the self-identification circuit is configured to monitor network identifier availability on a network communications bus and to transmit the identification status signal on a signal line independent of the network communications bus.

In some embodiments, the self-identification circuit is configured to set the identification enable signal to a first input state and to set the identification status output signal to a first output state, wherein the first input state corresponds to a low identification priority in which the self-identification circuit does not claim the network identifier and wherein the first output state communicates a low identification priority to another network device wherein the another network device does not claim the network identifier while the another network device is at the low identification priority.

In some embodiments, the identification enable signal is communicatively coupled to a first UPS identification status signal of a first UPS and the identification status signal is communicatively coupled to a second UPS identification enable signal of a second UPS. In further embodiments, after the first UPS claims the available network identifier, the first UPS identification status signal is changed from a first state to a second state that communicates a high identification priority to the identification enable signal of the apparatus.

In some embodiments, the self-identification circuit is configured to determine a network identifier corresponding to a relative position in the network, responsive to communications sent to the network by another apparatus.

In some embodiments, the identification enable signal includes a first state that corresponds to a low identification priority and a second state that corresponds to a high identification priority, wherein if the identification enable signal is communicatively coupled to the identification status signal of another device the identification enable signal will be set to a low identification priority until the another device has completed self-identification and will be set to a high identification priority after the another device self-identifies.

In some embodiments, the network includes a Controller Area Network (CAN) configured to communicatively couple an Uninterruptible Power Supply (UPS with at least one other UPS.

In some embodiments, the apparatus includes comprising means for selecting a network identifier from the available network identifiers.

In some embodiments of the invention, a method of self-identification of a device in a network includes determining an identifier via a self-identification process responsive to a relative position in the network. In further embodiments, methods include monitoring the network to determine an available identifier.

In some embodiments, methods include determining the state of an identification enable signal, wherein if the identification enable signal has a first state the self-identification process claims a network connection-determined available network identifier and wherein if the identification enable signal has a second state the self-identification process does not claim a network identifier.

In some embodiments, methods include setting an identification status signal to a first state if the device does not have a network identifier and setting the identification status signal to a second state if the device has claimed a network identifier.

In some embodiments, methods include communicatively coupling an identification enable signal line of the device to an identification status signal line of a first other device and communicatively coupling an identification status signal line of the device to an identification enable signal line of a second other device, wherein the first other device claims a network identifier based on network position relative to the device.

Some embodiments may include setting an identification enable signal to a first enable state and setting an identification status signal to a first status state when electrical power is applied to the device, wherein the first enable state corresponds to a low identification priority in which a network identifier is not claimed by the device, and wherein the first status state communicates a low identification priority for receipt by another device as an identification enable signal.

In further embodiments, the identification scheme includes a value based scheme wherein the network identifier is one of a plurality of sequentially arranged network identifiers having a sequence that corresponds to a plurality of network positions.

Some embodiments of the invention include a computer program product configured to carry out methods according to claim 12, including a computer readable medium having computer readable program code embodied therein.

In some embodiments of the invention a network device includes a network communications interface circuit configured to be coupled to a network and a self-identification circuit that determines network identifier availability responsive to communications on the network and assigns a determined available network identifier responsive to an identification enable signal.

In some embodiments, the self-identification circuit is configured to monitor network identifier availability on a network communications bus and to receive the identification enable signal on a signal line independent of the network communications bus. In some embodiments, the self-identification circuit is configured to generate an identification status output signal responsive to assignment of the available network identifier.

In some embodiments, the self-identification circuit is configured to monitor network identifier availability on a network communications bus and to transmit the identification status signal on a signal line independent of the network communications bus.

In some embodiments of the invention, a circuit for self-identification of modules in an Uninterruptible Power Supply (UPS) system includes a self-identification circuit included on a UPS system module, the self-identification circuit configured to receive an identification enable signal from another module if the module is not configured at a network position corresponding to a network identifier sequence starting value and to claim the network identifier starting value if the module does not receive the identification enable signal and a Controller Area Network (CAN) interface circuit configured to transmit/receive CAN formatted messages including messages requesting and responding to module identifier information.

In some embodiments, the circuit is configured to claim a network identifier value responsive to the state of the identification enable signal, wherein the state of the identification input is responsive to a state of an identification status signal line of another module, which is communicatively coupled to an input corresponding to the identification enable signal.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. As used herein the term "and/or" includes any and all combinations of one or more of the associated listed items. Like numbers refer to like elements throughout.

Figure 1:
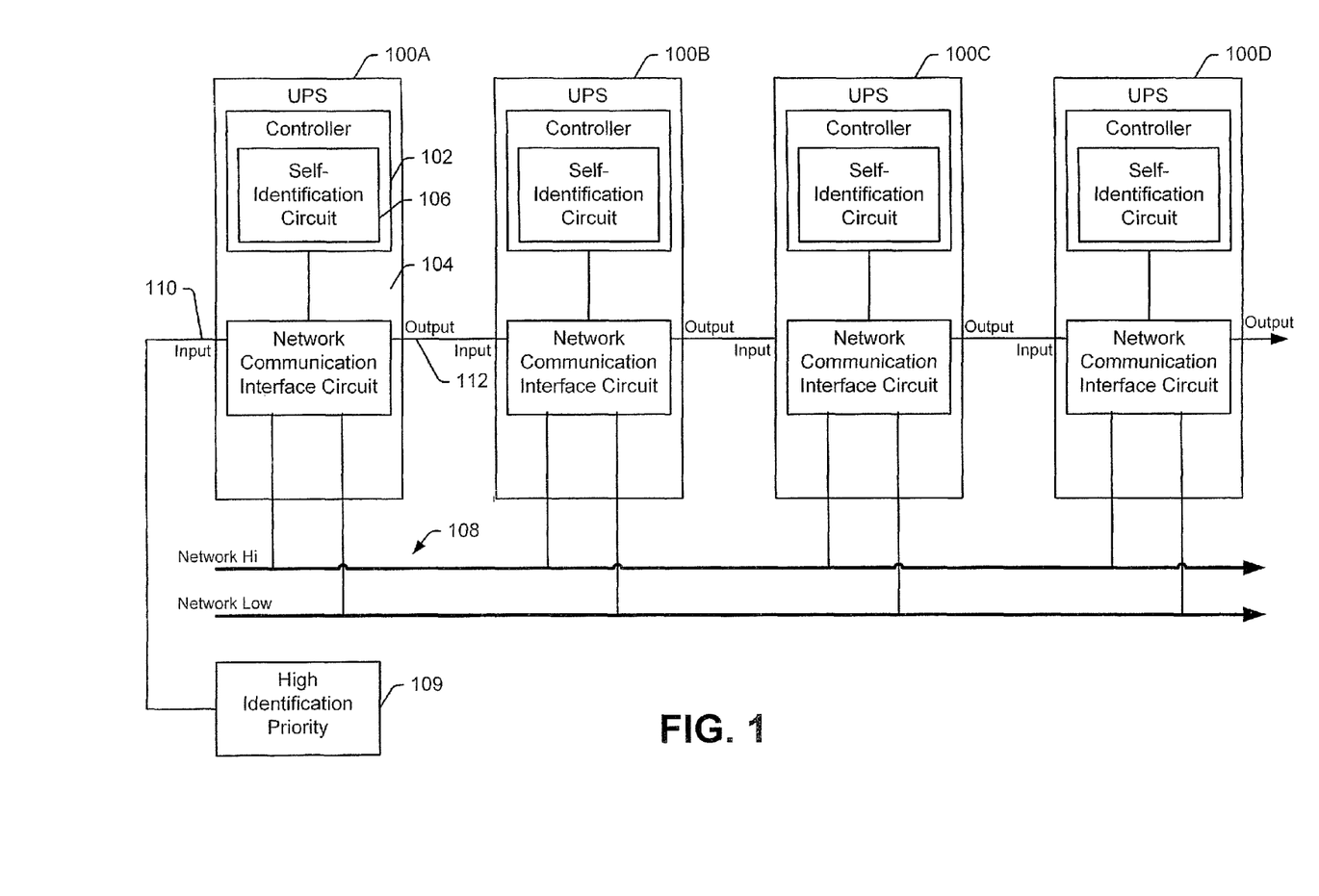
FIG. 1 is a block diagram illustrating multiple UPS's according various embodiments of the invention.

Reference is now made to FIG. 1, which is a block diagram illustrating multiple UPS's according various embodiments of the invention. Each UPS 100 is communicatively coupled to the other UPS's 100 via a network 108. The network 108 can include a variety of types of networks including, for example, a Controller Area Network (CAN). A UPS 100 includes a controller 102 configured to perform various control functions associated with providing uninterruptible power including, for example, controlling rectifiers, inverters, and switches, among others. The controller 102 is operatively coupled with a network communication interface circuit 104 that can be configured to be coupled to the network 108 and provide communication between the UPS 100 and the network 108. The controller 102 includes a self-identification circuit 106 configured to determine a network identifier availability responsive to communications on the network 108. In some embodiments, the self-identification circuit 106 can be included in the UPS 100 exclusive of the controller 102 in, for example, the network communication interface circuit 104. For example, the self-identification circuit 106 may determine that network identifiers one, two, and three are already in use by other UPS's 100 that are communicating on the network. In this manner, the self-identification circuit 106 could determine that network identifiers one two, and three are unavailable.

The self-identification circuit 106 also assigns an available network identifier in response to an identification enable signal that may be received at an input 110. The self-identification circuit 106 may monitor the network 108 via the network communication interface circuit 104 until an identification enable signal is received at input 110. In some embodiments, the input 110 may be configured to be independent of the network 108. In further embodiments, the input 110 can be configured as a component or integrated into the network 108. Once the identification enable signal is received, the self-identification circuit 106 may claim an available network identifier based on a predetermined rule, such as a sequence. In some embodiments described herein, for example, the network identifier can be selected from a range starting at a lowest numerical value and increasing by a unit of one for each subsequent network identifier. For example, a first UPS 100A could have a network identifier of one, a second UPS 100B could have a network identifier value of two, etc.

The input 110, as illustrated, can be communicatively coupled to an output 112 of another UPS 100, when available, or pulled to a specific logic level via an external and/or internal connection. For example, the input 110 of the first UPS 100A can be connected to a high identification priority signal source 109. In some embodiments, the high identification priority signal source can be a jumper to a connection point having a specific electrical potential, such as, for example, ground. In some embodiments, the input 110 can be brought to a specific logic level and/or potential via an internal signal generated within the controller 102 and/or the network communication interface circuit 104. In this manner, absent a connection to an output 112 of another UPS 100, the input 110 will be set at an initial state upon power-up and/or activation. The output 112 can also be set at a predetermined initial logic level and/or potential corresponding to an initial state upon power-up and/or activation. The self-identification circuit 106 of connected UPS 100B can receive a status output signal 112 from UPS 100A as an identification enable signal at the input 110. In this manner, the self-identification circuit 106 in each UPS 100 determines a network identifier based on a predetermined sequence and/or rule relative to the network position of the UPS 100.

By way of example, at power-up the inputs 110 and outputs 112 of all UPS's 100A-D can be internally set to a low identification priority. A high identification priority signal 109 can be sent to the first UPS 100A at the input 110. In some embodiments, a high identification priority can correspond to an identification enabled state that can be received at the inputs 110 and transmitted by the outputs 112. Similarly, the low identification priority can correspond to a identification disabled state that can be received at the inputs 110 and transmitted by the outputs 112.

In this manner, UPS's 100B-D can initialize with and continue to receive a low identification priority at their respective inputs 110 from the outputs 112 of adjacently connected UPS's 100A-C, respectively. The input 110 of the first UPS 100A can be at a high identification priority since it is receiving the high identification priority signal. Since the first UPS 100A is initially the only UPS 100 that has a high identification priority, it can claim the first network identifier. After claiming the first network identifier, the first UPS 100A can set its output 112 to a high identification priority thereby setting the input 110 of the second UPS 100B to a high identification priority. After claiming the second network identifier, the second UPS 100B will set its output 112 to a high identification priority. In this manner, each UPS 100 can claim a network identifier corresponding to its relative network position and/or location.

Figure 2:
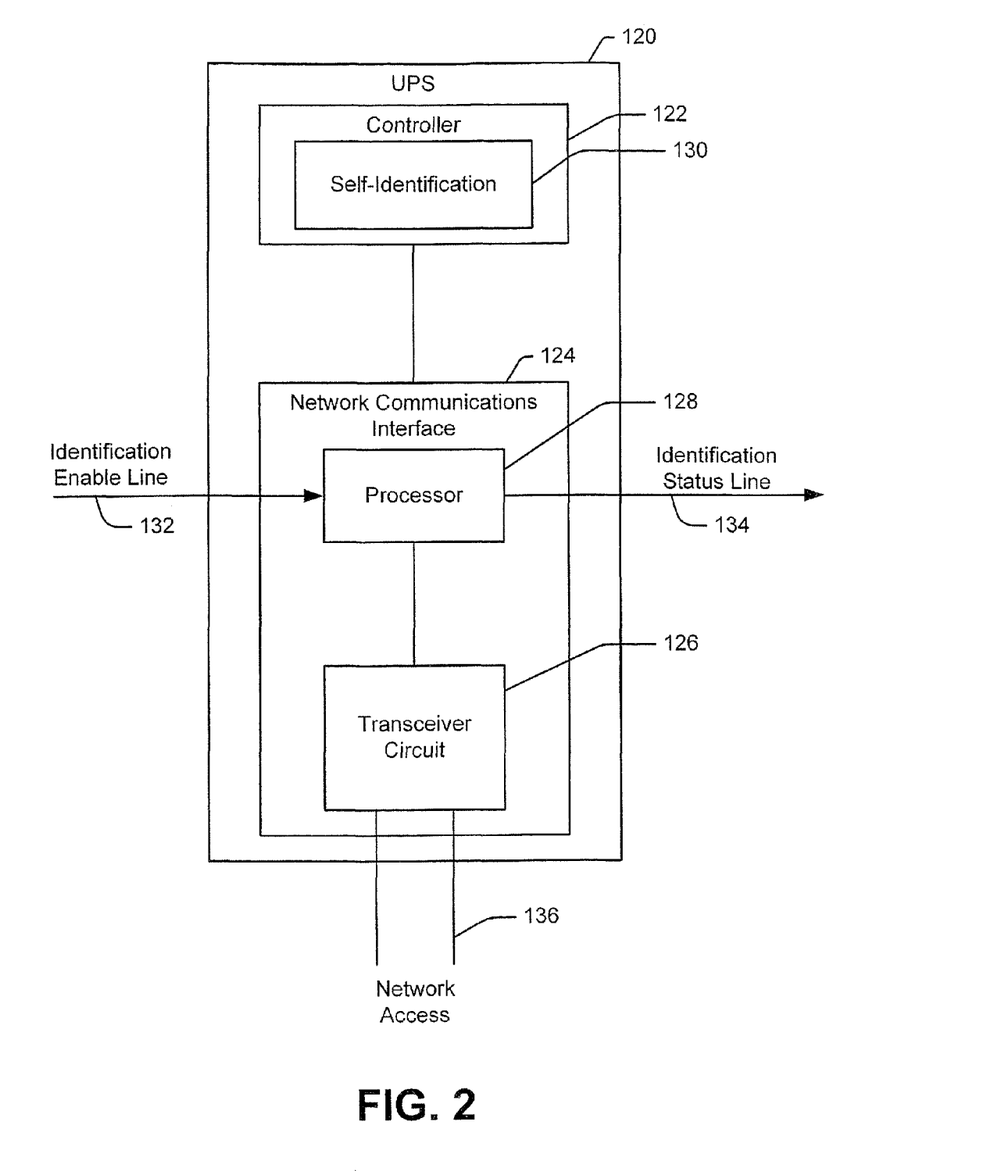
FIG. 2 is a block diagram illustrating a UPS incorporating self-identification according to some embodiments of the invention.

Reference is now made to FIG. 2, which is a block diagram illustrating a UPS incorporating self-identification according to some embodiments of the invention. The UPS 120 includes a controller 122 configured to perform various control functions associated with providing uninterruptible power including, for example, controlling rectifiers, inverters, and switches, among others. The controller 122 can be communicatively associated with a network communications interface 124 that is configured to perform and control communications between the controller 122 and one or more external networks. For example, a controller 122 may send status, load and system information regarding the UPS 120 to other network devices via the network communications interface 124. The controller 122 may also receive information and/or data from the network via the network communications interface 124. The network communications interface 124 may include a processor 128 (including associated memory) configured to perform data processing tasks in accordance with the functions of the network communications interface 124.

The controller 122 may be configured (e.g., using a software routine, module, object, or the like) to provide a self-identification circuit 130 configured to determine an available network identifier and, upon receipt of an enable signal via an identification enable line 132 at the network communications interface 124, claim a network identifier for the UPS 120. Further, the self-identification circuit 130 can control a state of an identification status line 134 at the network communications interface 124 that can be used by other UPS's as an identification enable signal. For example, the identification status line 134 can be changed from a low identification priority to a high identification priority after a network identifier is claimed. The network communications interface 124 may also include a transceiver circuit 126 configured to send and receive the data to the network via a network access 136.

Figure 3:
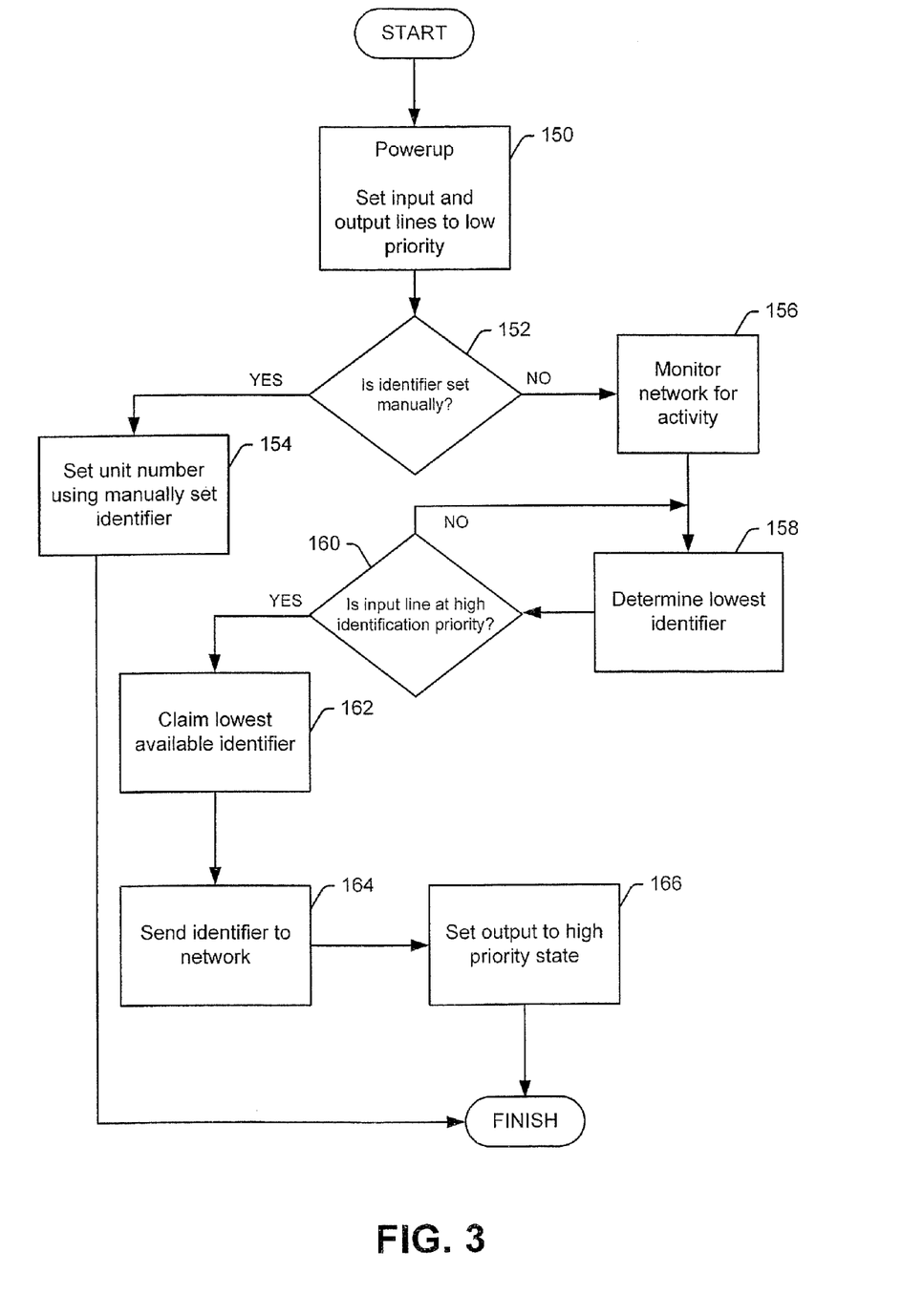
FIG. 3 is a flow diagram illustrating self-identification operations according to some embodiments of the invention.

Reference is now made to FIG. 3, which is a flow diagram illustrating a self-identification operation according to some embodiments of the invention. A self-identification operation can begin, for example, when a network device, such as a UPS, is powered up and input and output lines are set to a low identification priority (block 150). Although presented in the context of a UPS, self-identification operations herein can be used in any network device that can derive benefit from self-identification in an environment such that the network identification of the network device corresponds to a specific position and/or location in a network.

The operation determines if the network identifier is to be manually set, by for example, a technician performing a service call (block 152). If the network identifier is to be manually set, then the network device number and/or designation is set and the self-identification operation is finished. Otherwise, the network device monitors the network for activity and information from other network devices already in communication with the network (block 156). For example, the network device may receive information regarding network identifiers that are already claimed by other network devices. The lowest available identifier is determined by monitoring the network (block 158). If the input line is not set at a high identification priority, then the network monitoring continues and the lowest available network identifier is determined (block 160). Determining the lowest available network identifier continues until the input line is set to a high identification priority, at which point the lowest available network identifier is claimed (block 162).

After claiming the lowest available network identifier, the network device begins communicating over the network, including transmitting the claimed identifier to the network (block 164). In some embodiments, the network identifier can be sent in, for example, a source field of a network packet through the course of normal network communications. In this manner, additional network traffic can be minimized. The output is set to a high identification priority, for possible receipt as an input by another network device (block 166). The identification priority signal at the input can be configured to be at a high priority at, for example, either a high or low logical and/or analog signal state. Similarly, the high priority state of the output can be configured to correspond to the states of the input.

In use and operation, a first network device initializes with the input line set at a low identification priority and is not coupled to the output of another network device. Unlike the other network devices, the input of the first network device is configured to be driven to a high identification priority via some internally or externally generated signal that can be exclusive to the first network device. In this manner, the first network device claims the first available network identifier while the other network devices wait for their turn to claim a network identifier. After claiming a network identifier, the first network device signals the second network device, via the output line, to claim the next available identifier. After the second network device claims a network identifier, a third network device is signaled, via the output signal from the second network device, to claim the next available network identifier. Although a network identifier range can start at one and/or increment by one, some embodiments may include where the device starts at some value other than one and increments by some value other than one. Further, some embodiments may include network identifiers that are based on non-numerical designators such as letters and/or an alphanumeric combination. Still further, some embodiments can use a rule-based network identifier wherein the network identifier is determined via a formula and/or algorithm.

Figure 4:
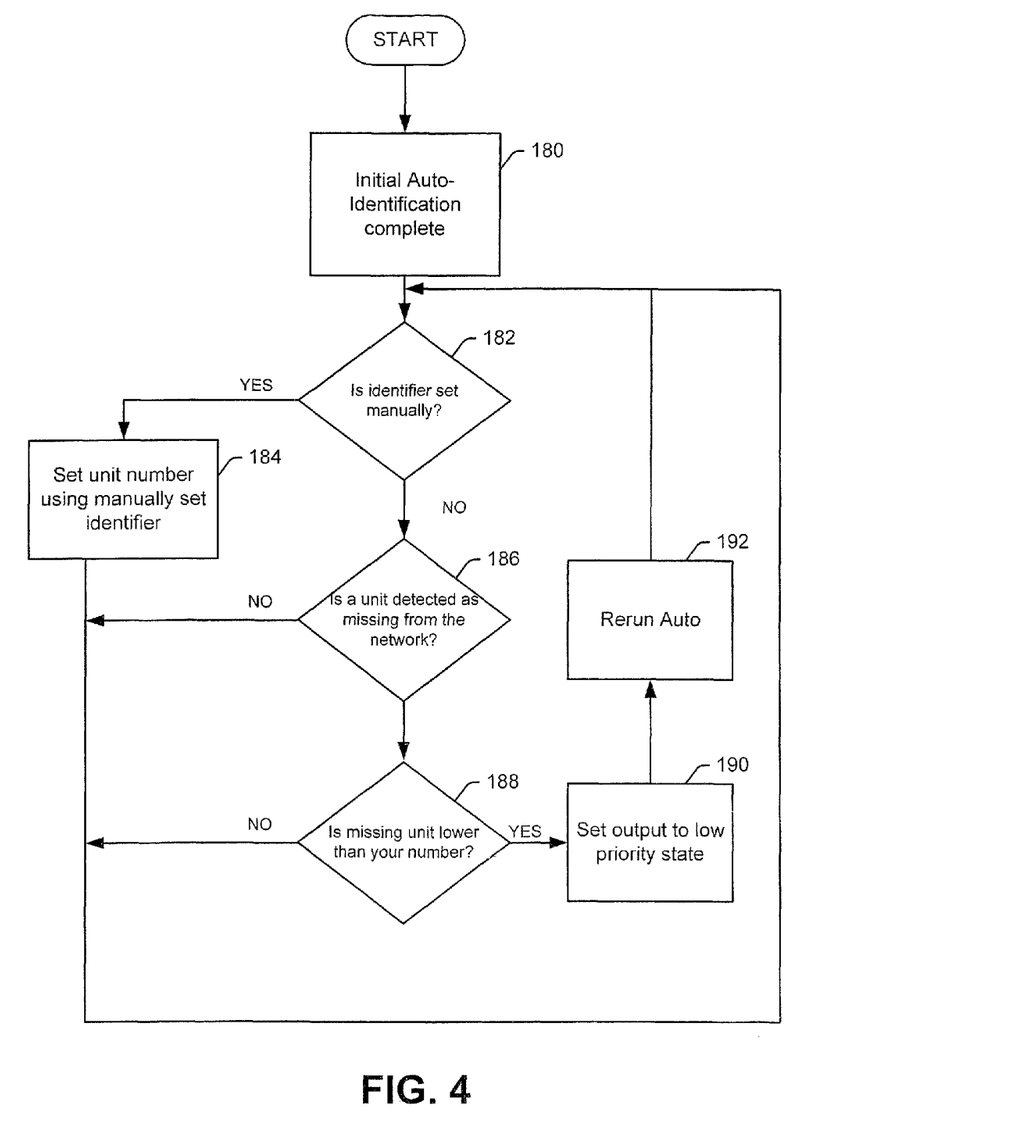
FIG. 4 is a flow diagram illustrating re-identification operations according to some embodiments of the invention.

Reference is now made to FIG. 4, which is a flow diagram illustrating a re-identification operation according to some embodiments of the invention. A re-identification operation occurs within network devices as necessary after an initial auto-identification operation is complete (block 180). The operation determines if the network identifier is to be manually set, by for example, a technician performing a service call (block 182). If the network identifier is to be manually set then the network device number and/or designation is set and the re-identification operation continues to execute in a recurring loop. If the network identifier is not manually set then the operation determines if a network device is missing from the network (block 186). If no network devices are missing from the network then the re-identification operation continues to execute in a recurring loop. If a network device is missing from the network, then the operation determines if a missing network device has a network identifier lower than that of the network device performing the re-identification operation (block 188). If a missing network device does not have a lower network identifier, then the re-identification operation continues to execute in a recurring loop. If the network identifier of a missing network device is lower than that of the network device performing the re-identification operation then the output is set to a low priority state (block 190). Setting the output state to a low priority state can place the self-identification operation of downstream and/or higher numbered network devices in a network monitoring mode until the self-identification of upstream and/or lower numbered network devices is completed. The auto-identification operation is rerun to permit the identification of any network devices that do not have network identifiers.

Figure 5:
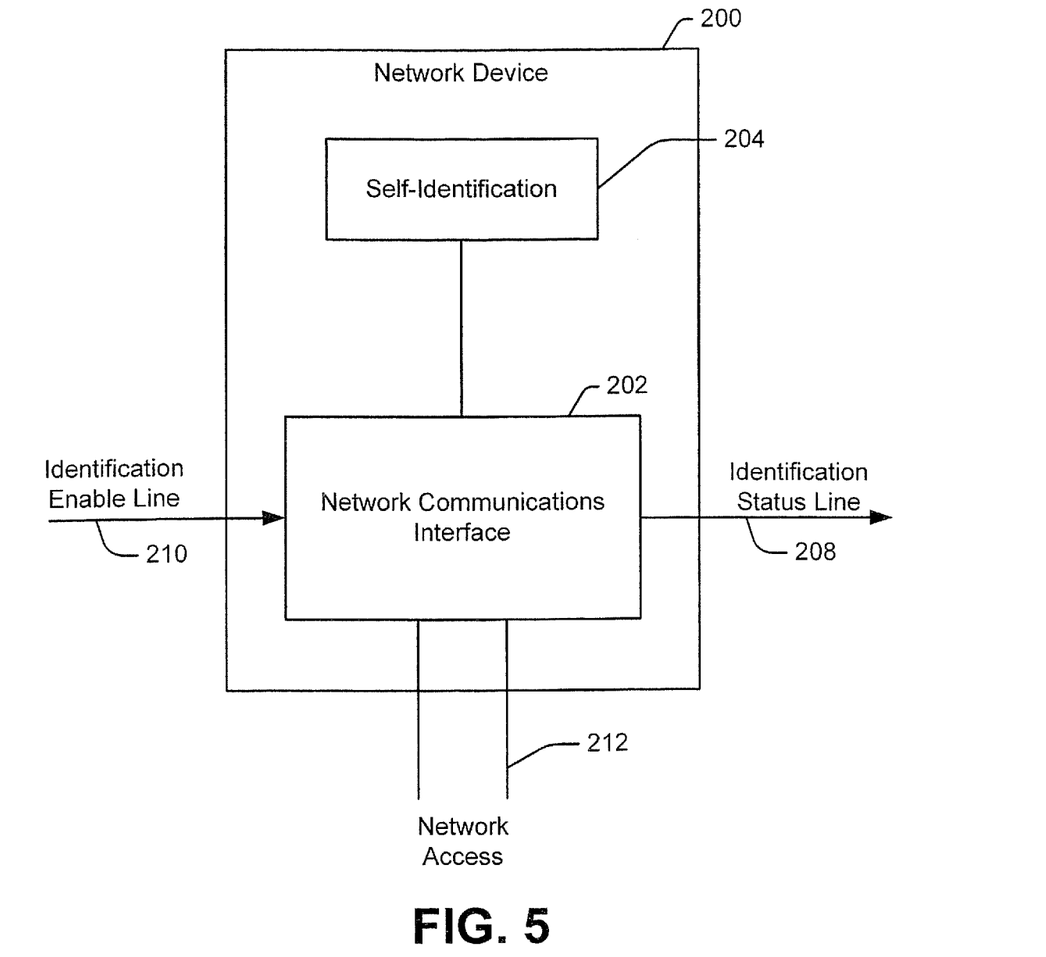
FIG. 5 is a block diagram illustrating a network device according to some embodiments of the invention.

Reference is now made to FIG. 5, which is a block diagram illustrating a network device according to some embodiments of the invention. The network device 200 can include a network communications interface 202 configured to communicate through a network access 212, to receive signals from an identification enable line 210 and to transmit signals via an identification status line 208. The network device 200 includes a self-identification module 204 configured to determine a network identifier responsive to communications from the network communications interface 202.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. An uninterruptible power supply (UPS) apparatus comprising:
   an uninterruptible power supply circuit configured to provide electrical power to a load corresponding to a loss of line power;
   a network communications interface circuit associated with the uninterruptible power supply circuit, configured to be coupled to a network; and
   a self-identification circuit that determines network identifier availability responsive to communications on the network and assigns a determined available network identifier responsive to an identification enable signal,
   wherein the self-identification circuit is configured to monitor network identifier availability by determining unavailable network identifiers using communications on a wired network communications bus that is operable to be coupled to at least one other uninterruptible power supply self-identification circuit, and
   wherein unavailable network identifiers include network identifiers that correspond to devices that are coupled to the network.

2. The apparatus of claim 1, wherein the self-identification circuit is configured to monitor network identifier availability on the network communications bus via the network communications interface circuit and to receive the identification enable signal on a signal line independent of the network communications bus.

3. The apparatus of claim 1, wherein the self-identification circuit is configured to generate an identification status output signal responsive to assignment of the available network identifier.

4. The apparatus of claim 3, wherein the self-identification circuit is configured to transmit the identification status signal on a signal line independent of the network communications bus.

5. The apparatus of claim 3, wherein the self-identification circuit is configured to set the identification enable signal to a first input state and to set the identification status output signal to a first output state, wherein the first input state corresponds to a low identification priority in which the self-identification circuit does not claim the network identifier and wherein the first output state communicates a low identification priority to another UPS wherein the another UPS does not claim the network identifier while the another UPS is at the low identification priority.

6. The apparatus of claim 3, wherein the identification enable signal is communicatively coupled to a first UPS identification status signal of a first UPS and the identification status signal is communicatively coupled to a second UPS identification enable signal of a second UPS.

7. The apparatus of claim 6, wherein after the first UPS claims the available network identifier, the first UPS identification status signal is changed from a first state to a second state that communicates a high identification priority to the identification enable signal of the apparatus.

8. The apparatus of claim 1, wherein the self-identification circuit is configured to determine a network identifier corresponding to a relative position in the network, responsive to communications sent to the network by another apparatus.

9. The apparatus of claim 1, wherein the identification enable signal comprises a first state that corresponds to a low identification priority and a second state that corresponds to a high identification priority, wherein if the identification enable signal is communicatively coupled to the identification status signal of another apparatus the identification enable signal will be set to a low identification priority until the another apparatus has completed self-identification and will be set to a high identification priority after the apparatus device self-identifies.

10. The apparatus of claim 1, wherein the network comprises a Controller Area Network (CAN) configured to communicatively couple an Uninterruptible Power Supply (UPS with at least one other UPS.

11. The apparatus of claim 1, further comprising means for selecting a network identifier from the available network identifiers.

12. The uninterruptible power supply (UPS) apparatus according to claim 1, wherein the determined available network identifier comprises an available network identifier having a lowest value among a plurality of available network identifiers.

13. A circuit for self-identification of modules in an Uninterruptible Power Supply (UPS) system comprising:
   a self-identification circuit included on a UPS system module, the self-identification circuit configured to receive an identification enable signal from another module by determining unavailable network identifiers using communications on a wired network communications bus that is operable to be coupled to at least one other uninterruptible power supply self-identification circuit to determine the network identifier that is available if the module is not configured at a network position corresponding to a network identifier sequence starting value; and
   a Controller Area Network (CAN) interface circuit configured to transmit/receive CAN formatted messages including messages requesting and responding to module identifier information,
   wherein unavailable network identifiers include network identifiers that correspond to devices that are coupled to the wired network communications bus.

14. A circuit according to claim 13, wherein the self-identification circuit is further configured to claim a network identifier value responsive to the state of the identification enable signal, wherein the state of the identification input is responsive to a state of an identification status signal line of another module, which is communicatively coupled to an input corresponding to the identification enable signal.

15. The circuit according to claim 14, wherein the self-identification circuit is further configured to claim the network identifier starting value if the module does not receive the identification enable signal.

16. The circuit according to claim 14, wherein the network identifier value that is claimed comprises an available network identifier value having a lowest value among a plurality of available network identifier values.

17. The circuit according to claim 14, wherein the self-identification circuit is configured to transmit the identification status signal on a signal line independent of the network communications bus.

* * * * *